M. J. JEANNOT.
NUT LOCK.
APPLICATION FILED MAR. 31, 1915.
1,145,486.
Patented July 6, 1915.
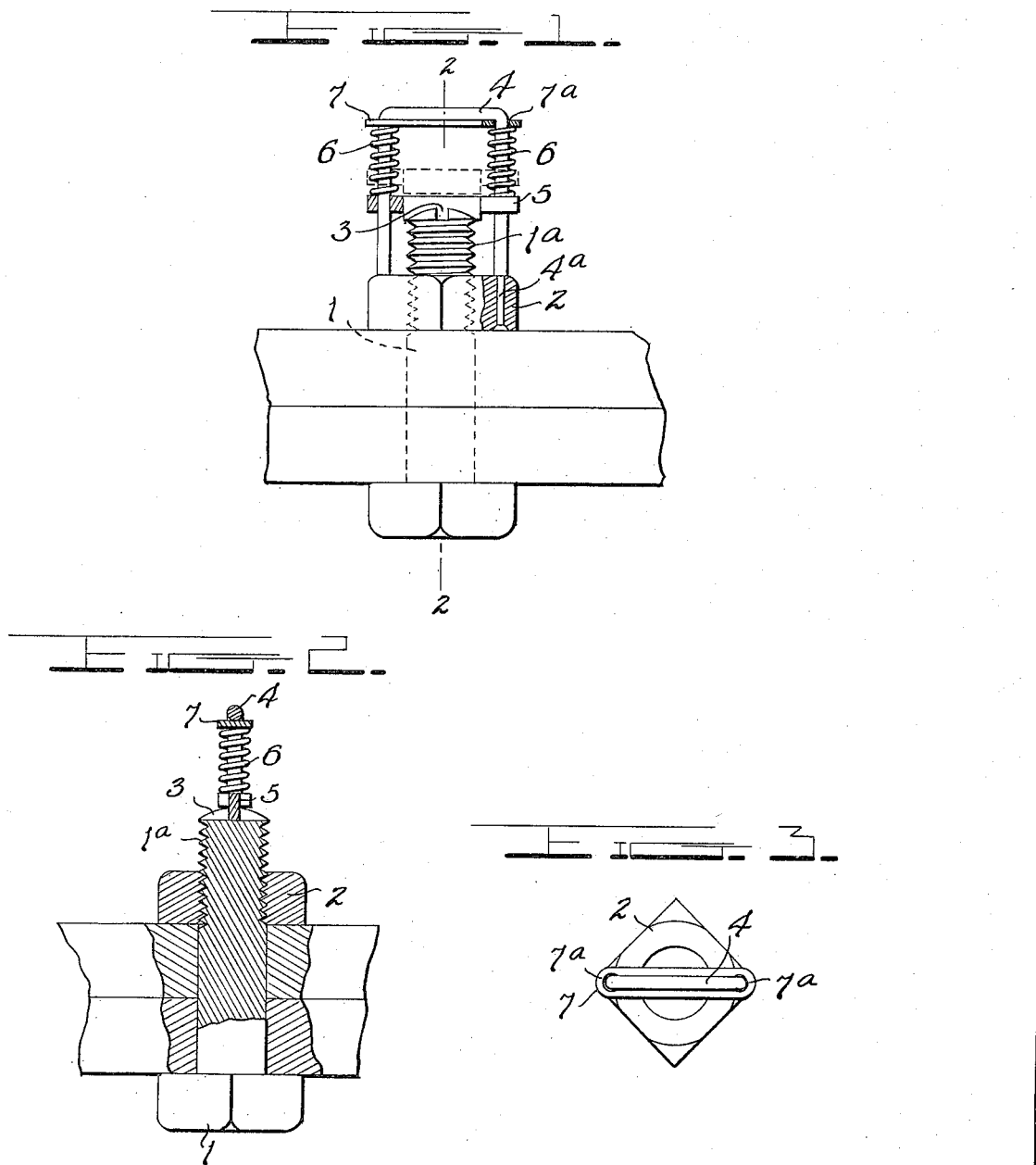
Witnesses
Harry B. Rook.
Harriet B. Cornwall
Inventor
M. J. Jeannot
H. S. Hill
Attorney

UNITED STATES PATENT OFFICE.

MITCHELL J. JEANNOT, OF GARDEN VALLEY, IDAHO.

NUT-LOCK.

1,145,486.

Specification of Letters Patent.

Patented July 6, 1915.

Application filed March 31, 1915. Serial No. 18,343.

*To all whom it may concern:*

Be it known that I, MITCHELL J. JEANNOT, a citizen of the United States, residing at Garden Valley, in the county of Boise and State of Idaho, have invented certain new and useful Improvements in Nut-Locks, of which the following is a specification.

The present invention relates to certain new and useful improvements in nut locks, and has for its object to provide a device of this character which embodies novel features of construction whereby the nut can be securely locked against rotation upon the bolt.

Further objects of the invention are to provide a nut lock which is comparatively simple and inexpensive in its construction, which admits of the nut being quickly released and either tightened or loosened as may be desired, which does not mutilate either the nut or the bolt and can be used repeatedly, which will not work loose under constant vibration, and which securely locks the nut and bolt together so that relative rotation of the two members is impossible.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which:—

Figure 1 is a side elevation of a nut lock constructed in accordance with the invention, the locking slide being shown by full lines in operative position and by dotted lines in inoperative position. Fig. 2 is a transverse sectional view on the line 2—2 of Fig. 1. Fig. 3 is a top plan view of the nut.

Corresponding and like parts are referred to in the following description and indicated in all the views of the drawings by the same reference characters.

Specifically describing the present embodiment of the invention, the numeral 1 designates a bolt which has the end thereof threaded in the usual manner as indicated at 1ª, and 2 a nut which is fitted upon the threaded end of the bolt. The extremity of the bolt 1 is provided with a series of transverse slots 3 which intersect at the axis of the bolt. The nut 2 is provided with a yoke 4 which projects outwardly from the top thereof so as to straddle the extremity of the bolt 1. The arms of the yoke 4 are arranged parallel to each other and also parallel to the axis of the bolt and slidably mounted upon the said arms is a locking key 5 which is adapted to engage any selected one of the slotted seats 3 to lock the nut against rotation upon the bolt. Fitted upon each of the arms of the yoke 4 and surrounding the same is a coil spring 6, said coil springs being interposed between a plate 7 applied to the outer end of the yoke and eyes 5ª at the extremities of the locking key 5 which loosely receive the arms of the yoke. The plate 7 is provided with openings 7ª to receive the arms of the yoke 4 and is normally held in a yielding engagement with the closed outer end of the yoke by the tension of the springs 6. The yoke is rigidly applied to the nut 2 and may be secured thereto in any suitable manner. In the present instance the extremities of the arms of the yoke are shown as having a reduced cross section, as indicated at 4ª, and passed through openings in the nut, the ends thereof being suitably upset or mashed to retain the yoke rigidly in position.

As long as the key 5 is seated within one of the slots 3 the nut 2 is held securely against rotation upon the bolt 1. However, by grasping the locking key 5 between the fingers or manipulating the same with some suitable tool it can be moved outwardly upon the yoke 4 against the action of the coil springs 6. The nut 2 can then be rotated freely upon the bolt and either tightened or loosened as desired. In a similar manner, when placing the nut in position or removing it therefrom it is merely necessary to slide the locking key 5 and hold it in inoperative position while manipulating the nut. After the nut has been screwed firmly into position the locking key 5 is released and permitted to slide into engagement with one of the slotted seats 3, thereby locking the nut in position upon the bolt and rendering it impossible for the nut to work loose, even when subjected to constant vibration.

Having thus described the invention, what I claim as new and desire to secure by Letters Patent, is:—

A nut lock including a bolt having a plurality of intersecting transverse slots in the end thereof, a nut threaded upon the bolt, a yoke projecting outwardly from the head of the nut so as to straddle the end of the bolt, a locking key provided at its ends with eyes which are slidable upon the respective arms of the yoke, said locking key being movable toward and away from the end of the bolt and being adapted to engage one of the slots in the end of the bolt to lock the nut against rotation upon the bolt, a plate provided with openings receiving the arms of the yoke and fitted against the closed end of the yoke, and coil springs surrounding the arms of the yoke and interposed between the plate and the locking key to hold the same yieldably in operative position.

In testimony whereof I affix my signature in presence of two witnesses.

MITCHELL J. JEANNOT.

Witnesses:
MARY N. CASTLE,
JOSEPH A. JEANNOT.